Dec. 21, 1954   B. MAILLARD   2,697,381
DEVICE FOR TRANSFORMING A RECIPROCATING
LINEAR MOTION INTO A ROTARY MOTION
Filed Feb. 19, 1952   3 Sheets-Sheet 1
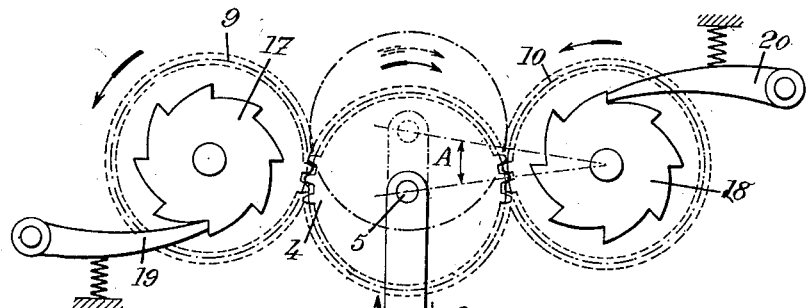
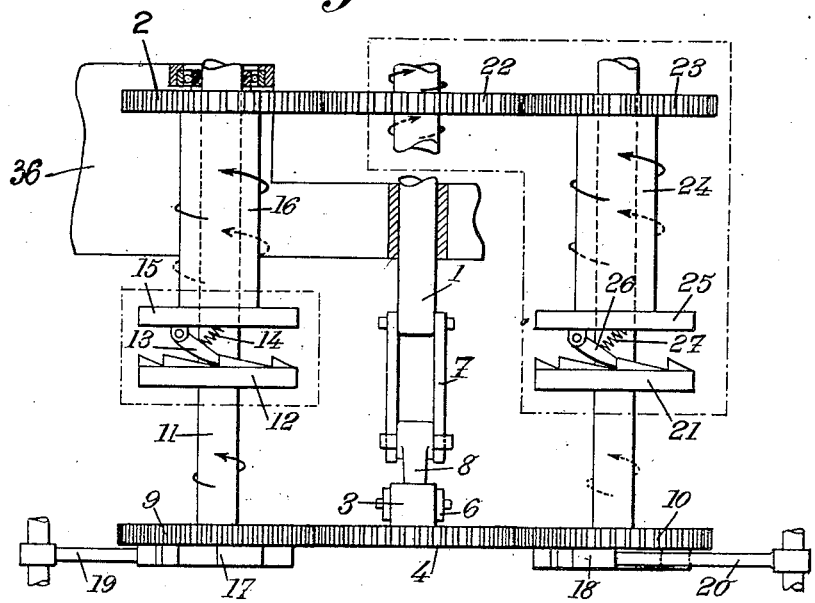
INVENTOR
BERNARD MAILLARD
BY
Robert B Graham
ATTORNEY

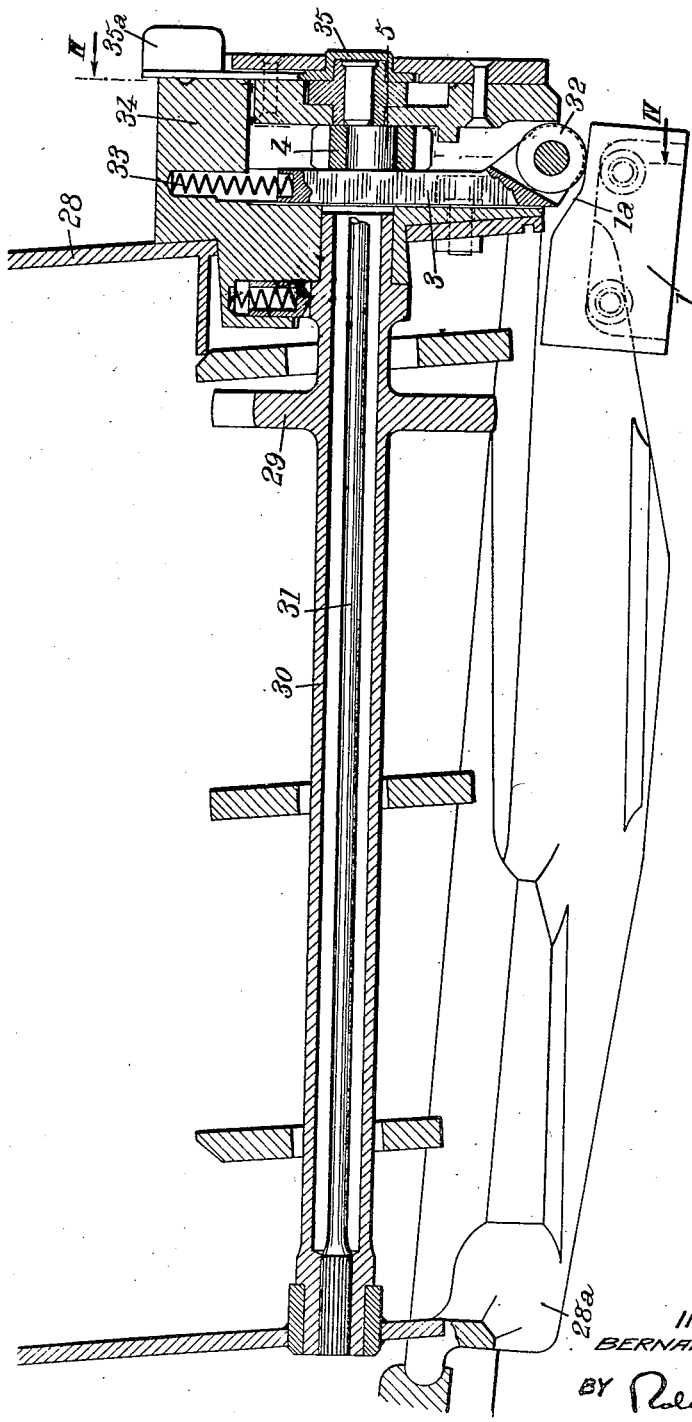

Dec. 21, 1954 B. MAILLARD 2,697,381
DEVICE FOR TRANSFORMING A RECIPROCATING
LINEAR MOTION INTO A ROTARY MOTION
Filed Feb. 19, 1952 3 Sheets-Sheet 3
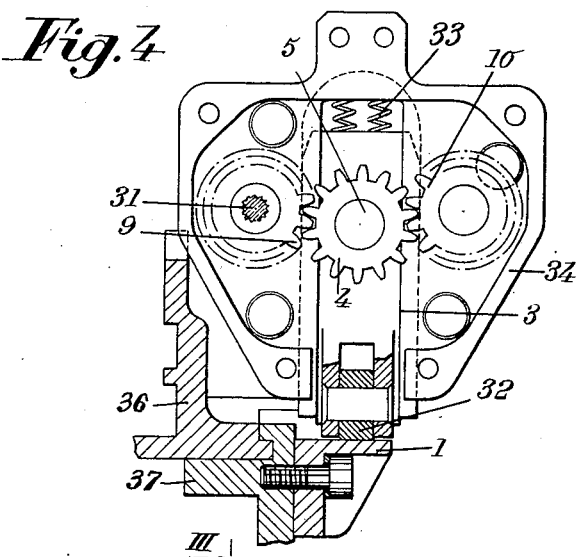
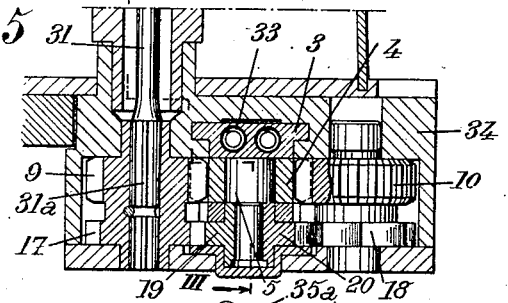
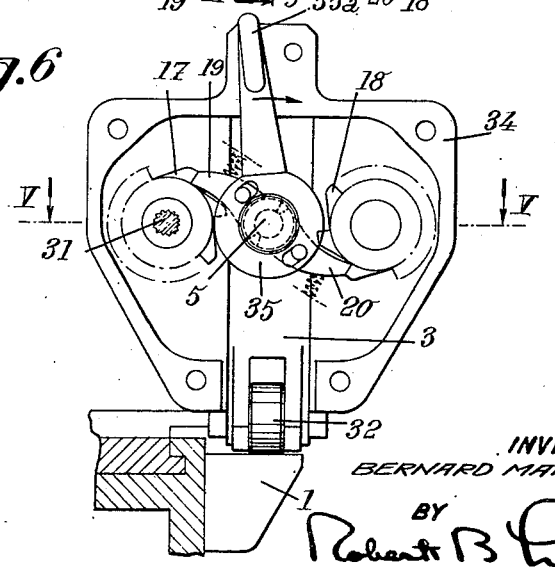
INVENTOR
BERNARD MAILLARD,
BY
Robert B. [signature]
ATTORNEY United States Patent Office 2,697,381
Patented Dec. 21, 1954

2,697,381
DEVICE FOR TRANSFORMING A RECIPROCATING LINEAR MOTION INTO A ROTARY MOTION

Bernard Maillard, Geneva, Switzerland, assignor to Brevets Aero-Mecaniques, S. A., Geneva, Switzerland, a society of Switzerland Application February 19, 1952, Serial No. 272,402
Claims priority, application Luxemburg February 19, 1951
5 Claims. (Cl. 89—33)

The present invention relates to devices for transforming a reciprocating linear motion of small amplitude of one part into a rotary motion always in the same direction and of relatively great amplitude of another part, and this invention is more especially although not exclusively concerned with devices of this kind for actuating, by means of a reciprocating element of an automatic firearm, a rotating element of a magazine or belt feed mechanism for feeding ammunition to this arm.

The chief object of this invention is to provide a device of this kind which is better adapted to meet the requirements of practice than those used for the same purpose up to the present time.

It consists chiefly in connecting with the first mentioned part a reciprocating member movable along a rectilinear path and carrying a pinion freely journalled on said member about an axis perpendicular to said path, this pinion being in mesh with two other pinions journalled in the frame of the device about respective axes located on either side of said first mentioned pinion and parallel to the axis thereof, one of these two second mentioned pinions being operatively connected with the second mentioned part (to which a rotary motion is to be given) so as to drive it in at least one direction of rotation, and both of these second mentioned pinions being allowed to rotate only in one direction.

Other features of the present invention will become apparent in the course of the following detailed description of some embodiments thereof, given merely by way of example, and in which:

Fig. 1 is an end view of a device according to my invention;

Fig. 1a is a side elevational view of a portion of this device;

Fig. 2 is a plan view corresponding to Fig. 1;

Fig. 3 is a longitudinal section on the line III—III of Fig. 5 showing a mechanism for driving the cartridges in an automatic firearm magazine, this mechanism including a device according to my invention;

Fig. 4 is a vertical section on the line IV—IV of Fig. 3;

Fig. 5 is a cross section on the line V—V of Fig. 6;

Fig. 6 is an end view of the mechanism of Figs. 3 to 5, with the closure plate removed.

Referring to Figs. 1, 1a and 2, I will first describe a device for transforming the reciprocating motion of a part 1 into a rotary motion, always in the same direction, of another part, constituted by pinion 2.

It will first be supposed that it is desired merely to transform into rotary displacements of pinion 2 the rectilinear displacements in one direction of part 1, for instance the displacements of part 1 in the direction of the solid line arrow of Fig. 1a, so that the motion of pinion 2 is intermittent and the displacements of part 1 in the other direction (from left to right on Fig. 1a) have no effect upon the rotation of this pinion.

Member 1 is made to actuate a reciprocating sliding member 3 carrying, freely journalled thereon, a pinion 4 mounted on an axis 5 perpendicular to the path of movement of member 3. The connection between part 1 and member 3 is for instance constituted, as shown by Figs. 1a and 1, by a bell crank lever 8 to the ends of which are pivoted links 6 and 7 respectively, the other ends of these links being pivoted to member 3 and part 1 respectively.

On the frame 36 of the device, in which pinion 2 is journalled, are also journalled two pinions 9 and 10, in mesh with pinion 4 on either side thereof, about axes parallel to axis 5.

One of these two last mentioned pinions, to wit pinion 9, is coupled with pinion 2 so as to drive it in at least one direction. This coupling might be obtained by rigidly fixing pinion 2 on spindle 11 rigid with pinion 9. But, in the construction of Figs. 1 and 2 and for reasons which will be apparent hereinafter, a ratchet wheel 12 keyed on said spindle 11 cooperates with a pawl 13 urged by a spring 14 toward the teeth of said ratchet wheel 12, this pawl being pivoted to a disc 15 mounted on a sleeve 16 freely rotatable about spindle 11 and rigid with pinion 2.

Pinions 9 and 10 carry, rigid therewith, ratchet wheels 17 and 18 respectively, cooperating with pawls 19 and 20 arranged to enable pinions 9 and 10 to rotate only in one direction, the same for both of them, the anticlockwise direction in the example shown.

Advantageously, as shown, pinions 4, 9 and 10 are of the same diameter, and the limit positions of the axis of pinion 4 when sliding member 3 is reciprocating are symmetrical with respect to the line passing through the centers of pinions 9 and 10. The angle A made by two lines starting from one of these centers (for instance that of pinion 10, as shown) and passing through the end positions of said axis of pinion 4 is small so that, despite the fact that the conditions of meshing of pinion 4 with pinions 9 and 10 are rigorously correct only when axis 5 is on the line of the centers of pinions 9 and 10, meshing is however ensured under satisfactory conditions when axis 5 is in these end positions.

Supposing, first, that the device includes only the elements above described, i. e. that the elements surrounded by the dot-and-dash lines of Fig. 2 do not exist, this device works as follows:

When part 1 is moving toward the left of Fig. 1a (solid line arrow), sliding member 3 is moving toward the top of Fig. 1 (solid line arrow) and pinion 4 would tend to rotate pinions 9 and 10 in opposed directions. But pawl 20 prevents such a rotation of pinion 10 and, actually, pinion 4 rolls upon said pinion 10 to drive pinion 9 in the anti-clockwise direction (as permitted by pawl 19). This rotation of pinion 9 is transmitted to pinion 2 through pawl and ratchet means 13—12.

During the next stroke of part 1 and member 3 in the opposed direction (dotted lines arrows), pinion 4 would tend to rotate pinions 9 and 10 in directions opposed to those above considered (i. e. the clockwise direction for pinion 9 and the anticlockwise direction for pinion 10). Pawl 19 prevents such a rotation of pinion 9, which therefore remains in the position it occupied at the end of the preceding displacement. Pinion 4 rolls on pinion 9 and drives pinion 10 in the anti-clockwise direction, but as, in the hypothesis above indicated (structure inside the dot-and-dash lines of Fig. 2 supposed not to exist), there is no connection between pinion 10 and pinion 2, this stroke of part 1 has no effect upon this pinion 2. At the end thereof, the parts are ready to impart a further rotation to pinion 2 in the anti-clockwise direction, and so on.

If, now, it is desired to have both strokes of part 1 operative to rotate pinion 2 (always in the same direction), I provide the following connection (shown inside the dot-and-dash lines of Fig. 2) between pinion 10 and pinion 2: Pinion 10 carries, rigid therewith, a ratchet wheel 21 cooperating with a pawl 26, urged by a spring 27, pivoted to a disc 25 rigid with a sleeve 24 itself rigid with a pinion 23. A pinion 22 freely journalled in the frame of the device interconnects pinions 2 and 23.

The device thus completed works as follows:

During the displacements of part 1 and member 3 indicated by the solid line arrows, everything takes place as above described, concerning pinions 4, 10, 9 and 2. Pinion 2 rotates in the anti-clockwise direction. It therefore drives pinion 23, also in the anti-clockwise direction and pawl 26 runs along the teeth of ratchet wheel 21, which is stationary, same as pinion 10.

During the next stroke of part 1 and member 3 in the opposed direction (dotted lines arrows), pinion 9 is stopped and pinion 10 is driven in the anti-clockwise direction. This movement of pinion 10 is transmitted through pawl and ratchet means 26—21, sleeve 24, pinion 23 and pinion 22, to pinion 2, which is therefore driven, still in the anti-clockwise direction.

It is pointed out that, with a mechanism as above described, the ratio of the rectilinear velocity of part 1 to the angular velocity of pinion 2 remains practically constant during the whole of the cycle of operation.

Furthermore, it is always possible to transform reciprocating rectilinear displacements of relatively small amplitude into angular displacements of relatively higher amplitude, for instance by providing between part 1 and sliding mmeber 3 an amplifying mechanical connection such that the displacements of member 3 are greater than the corresponding displacements of part 1.

A device as above described is particularly adapted to be used in an automatic firearm to operate a driving element in a cartridge magazine or a cartridge belt feed mechanism under the effect of the motion of a reciprocating part of said firearm.

By way of example, I will indicate how a device of the first type above described (i. e. that not including the parts shown inside the dot-and-dash frame of Fig 2) can be used to operate a cartridge magazine 28 (Fig. 3) including, close to its delivery passage 28a, a toothed wheel 29 intended to accelerate the movement toward the firearm of the cartridges located in the vicinity of this delivery passage 28a. This toothed wheel 29 is rigid with a tubular shaft 30 journalled in the magazine casing and one end of which is coupled with one end of a torsion bar 31, the other end of which corresponds to the rotary part 2 of the above described device.

In this application of my device, the part having a reciprocating rectilinear motion is constituted by the firearm breech casing movably mounted in a fixed support, constituted by the firearm cradle 36, on which magazine 28 is mounted.

As shown by Figs. 3 to 6, the breech casing 37 of the firearm carries a piece 1 provided with an inclined surface 1a which, during the recoil stroke, imparts an upward motion to a roller 32 journalled in a member 3 slidably carried by magazine 28 and subjected to the action of return means constituted by springs 33, whereby the reciprocating rectilinear motion of piece 1 imparts a corresponding reciprocating rectilinear motion to member 3.

All the parts above described with reference to Figs. 1 and 2 (with the exception of those inside the dot-and-dash frame of Fig. 2) are housed in a casing 34 provided at the rear of magazine 28. There is however a slight difference with the arrangement of Fig. 2, in that pinion 9 is directly keyed, through splines 31a, on the end of torsion bar 31 (which corresponds to pinion 2 of Figs. 1–2).

Advantageously, in the case of such a mechanism, means are provided for temporarily bringing pawls 19 and 20 out of action to make it possible to charge cartridges into the magazine. With these two pawls out of action, the whole of wheel 29, shaft 30, bar 31 and pinions 9, 4 and 10 can rotate in directions opposed to the normal directions of operation, so that the cartridges can be pushed into the magazine.

In order to make it possible to place pawls 19 and 20 in this inactive position, these pawls are mounted on the axis 5 of pinion 4, and a disc 35 rotatable about said axis and operable through a lever 35a is provided with two elongated slots cooperating with pins carried by pawls 19 and 20. Thus, rotation of lever 35a in the direction of the arrow of Fig. 6 draws pawls 19 and 20 away from the teeth of ratchet wheels 17 and 18 respectively.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A device for transforming a rectilinear reciprocating motion of one part into a rotary motion always in the same direction of another part, both of these parts being mounted on a common support, which device comprises, in combination, a reciprocating member movable with respect to said support along a rectilinear path and operatively connected with said first mentioned part to reciprocate in synchronism therewith, a pinion freely journalled in said member about an axis perpendicular to said path, two other pinions in mesh with said pinion and journalled with respect to said support about respective axes located on either side of said first mentioned pinion and parallel to the axis thereof, unidirectional stopping means cooperating with said two second mentioned pinions to allow them to rotate only in one direction, the same for both of them, and means for coupling the second mentioned part with one of said two second mentioned pinions at least while this last mentioned pinion is being rotated by the first mentioned pinion.

2. A device according to claim 1 in which the three pinions are of the same diameter and the first mentioned pinion has movements of equal and relatively small amplitude on either side of the line of the centers of the two second mentioned pinions.

3. A device for transforming a rectilinear reciprocating motion of one part into a rotary motion always in the same direction of another part, both of these parts being mounted on a common support, which device comprises, in combination, a reciprocating member movable with respect to said support along a rectilinear path and operatively connected with said first mentioned part to reciprocate in synchronism therewith, a pinion freely journalled in said member about an axis perpendicular to said path, two other pinions in mesh with said pinion and journalled with respect to said support about respective axes located on either side of said first mentioned pinion and parallel to the axis thereof, unidirectional stopping means cooperating with said two second mentioned pinions to allow them to rotate only in one direction, the same for both of them, and means for constantly coupling the second mentioned part with one of said two second mentioned pinions, the other of these two second mentioned pinions being unconnected with said second mentioned part.

4. A device for transforming a rectilinear reciprocating motion of one part into a rotary motion always in the same direction of another part, both of these parts being mounted in a common support, which device comprises, in combination, a reciprocating member movable with respect to said support along a rectilinear path and operatively connected with said first mentioned part to reciprocate in synchronism therewith, a pinion freely journalled in said member about an axis perpendicular to said path, two other pinions in mesh with said pinion and journalled with respect to said support about respective axes located on either side of said first mentioned pinion and parallel to the axis thereof, unidirectional stopping means cooperating with said two second mentioned pinions to allow them to rotate only in one direction, the same for both of them, and unidirectional means for coupling the second mentioned part with each of said two second mentioned pinions while it is being rotated by the first mentioned pinion.

5. In an automatic firearm including a support, a part movable in said support with a rectilinear reciprocating motion, a cartridge magazine fixed to said support including a part movable with a rotary motion always in the same direction, in combination, a reciprocating member movable in said support along a rectilinear path and operatively connected with said first mentioned part to reciprocate in synchronism therewith, a pinion freely journalled in said member about an axis perpendicular to said path, two other pinions in mesh with said pinion and journalled with respect to said support about respective axes located on either side of said first mentioned pinion and parallel to the axis thereof, unidirectional stopping means cooperating with said two second mentioned pinions to allow them to rotate only in one direction, the same for both of them, means for coupling the second mentioned part with one of said two second mentioned pinions at least while this last mentioned pinion is being rotated by the first mentioned pinion, and means for placing at will out of action said unidirectional stopping means, whereby cartridges can be introduced into said magazine.

References Cited in the file of this patent

UNITED STATES PATENTS

| Number | Name | Date |
|---|---|---|
| 397,520 | Rourk | Feb. 12, 1889 |
| 1,813,614 | Franks | July 7, 1931 |
| 2,610,520 | Snow | Sept. 16, 1952 |